United States Patent
Bshara et al.

(10) Patent No.: US 10,901,492 B1
(45) Date of Patent: Jan. 26, 2021

(54) POWER REDUCTION IN PROCESSOR PIPELINE BY DETECTING ZEROS

(71) Applicant: Amazon Technologies, Inc., Seattle, WA (US)

(72) Inventors: Nafea Bshara, Cupertino, CA (US); Ron Diamant, Santa Clara, CA (US); Randy Renfu Huang, Morgan Hill, CA (US); Ali Ghassan Saidi, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 102 days.

(21) Appl. No.: 16/369,696

(22) Filed: Mar. 29, 2019

(51) Int. Cl.
| | |
|---|---|
| *G06F 1/26* | (2006.01) |
| *G06F 1/32* | (2019.01) |
| *G06F 1/329* | (2019.01) |
| *G06F 7/523* | (2006.01) |
| *G06F 7/57* | (2006.01) |
| *G06F 9/30* | (2018.01) |

(52) U.S. Cl.
CPC .............. *G06F 1/329* (2013.01); *G06F 7/523* (2013.01); *G06F 7/57* (2013.01); *G06F 9/3001* (2013.01)

(58) Field of Classification Search
CPC . G06F 1/329; G06F 7/57; G06F 7/523; G06F 9/3001
See application file for complete search history.

(56) References Cited

U.S. PATENT DOCUMENTS

| | | | | |
|---|---|---|---|---|
| 5,666,300 A | * | 9/1997 | Adelman | G06F 1/32 708/521 |
| 5,943,250 A | * | 8/1999 | Kim | G06F 7/5338 708/625 |
| 8,645,450 B1 | * | 2/2014 | Choe | G06F 7/483 708/523 |
| 2015/0095394 A1 | * | 4/2015 | Finchelstein | G06F 7/5443 708/523 |

* cited by examiner

*Primary Examiner* — Nitin C Patel
(74) *Attorney, Agent, or Firm* — Weaver Austin Villeneuve & Sampson LLP

(57) ABSTRACT

Techniques are described for power reduction in a computer processor based on detection of whether data destined for input to an arithmetic logic unit (ALU) has a particular value. The data is written to a register prior to performing an arithmetic or logical operation using the data as an operand. Depending on a timing of when the data is supplied to the register, the determination is made before or after the data is written to the register, and a memory associated with the register is updated with a result of the determination. Contents of the memory are used to make a decision whether to allow the ALU to perform the arithmetic or logical operation. The memory can be implemented as a non-architectural register.

20 Claims, 9 Drawing Sheets

700

```
┌─────────────────────────────────────────────────────┐
│ Initiate a bypass decision in response to detecting │
│ that data is to be read from an architectural       │
│ register for input to an arithmetic logic unit      │
│                        702                          │
└─────────────────────────────────────────────────────┘
                          │
                          ▼
┌─────────────────────────────────────────────────────┐
│ Determine whether zero detection has been performed │
│           on the architectural register             │
│                        704                          │
└─────────────────────────────────────────────────────┘
                          │
                          ▼
┌ ─ ─ ─ ─ ─ ─ ─ ─ ─ ─ ─ ─ ─ ─ ─ ─ ─ ─ ─ ─ ─ ─ ─ ─ ─ ┐
    If zero detection has been performed (valid flag of
│ corresponding attribute register has been set), determine │
   if the data is all zeros and activate bypass mechanism
│                     accordingly                     │
                          706
└ ─ ─ ─ ─ ─ ─ ─ ─ ─ ─ ─ ─ ─ ─ ─ ─ ─ ─ ─ ─ ─ ─ ─ ─ ─ ┘
                          │
                          ▼
┌ ─ ─ ─ ─ ─ ─ ─ ─ ─ ─ ─ ─ ─ ─ ─ ─ ─ ─ ─ ─ ─ ─ ─ ─ ─ ┐
│ If zero detection has not yet been performed, decide not │
│          to activate bypass mechanism               │
│                        708                          │
└ ─ ─ ─ ─ ─ ─ ─ ─ ─ ─ ─ ─ ─ ─ ─ ─ ─ ─ ─ ─ ─ ─ ─ ─ ─ ┘
```

FIG. 7

POWER REDUCTION IN PROCESSOR PIPELINE BY DETECTING ZEROS

BACKGROUND

Computer processors perform arithmetic operations such as addition, multiplication, and division. The processor components responsible for performing arithmetic operations (arithmetic logic units, known as ALUs) are among the processor components that consume the greatest amount of power. Some arithmetic operations are especially power intensive, for example, floating point multiplication. One way to reduce the amount of power consumed by a processor is to avoid performing a multiplication when one of the inputs is zero. Logic for zero detection tends to increase the amount of circuitry (e.g., transistors and logic gates) needed for performing arithmetic operations. Arithmetic operations can be time-consuming in comparison to non-arithmetic operations, so it is generally desirable to minimize any additional logic used in connection with arithmetic operations, as such logic could potentially reduce operating frequency. For this reason, zero detection has not been implemented inside the processor itself because processor designers have attempted to design for generally higher operating frequencies.

BRIEF DESCRIPTION OF THE DRAWINGS

Various embodiments in accordance with the present disclosure will be described with reference to the drawings, in which:

FIG. 7 illustrates an example process for power reduction based on zero detection according to certain aspects of the disclosure;

DETAILED DESCRIPTION

Figure 1:
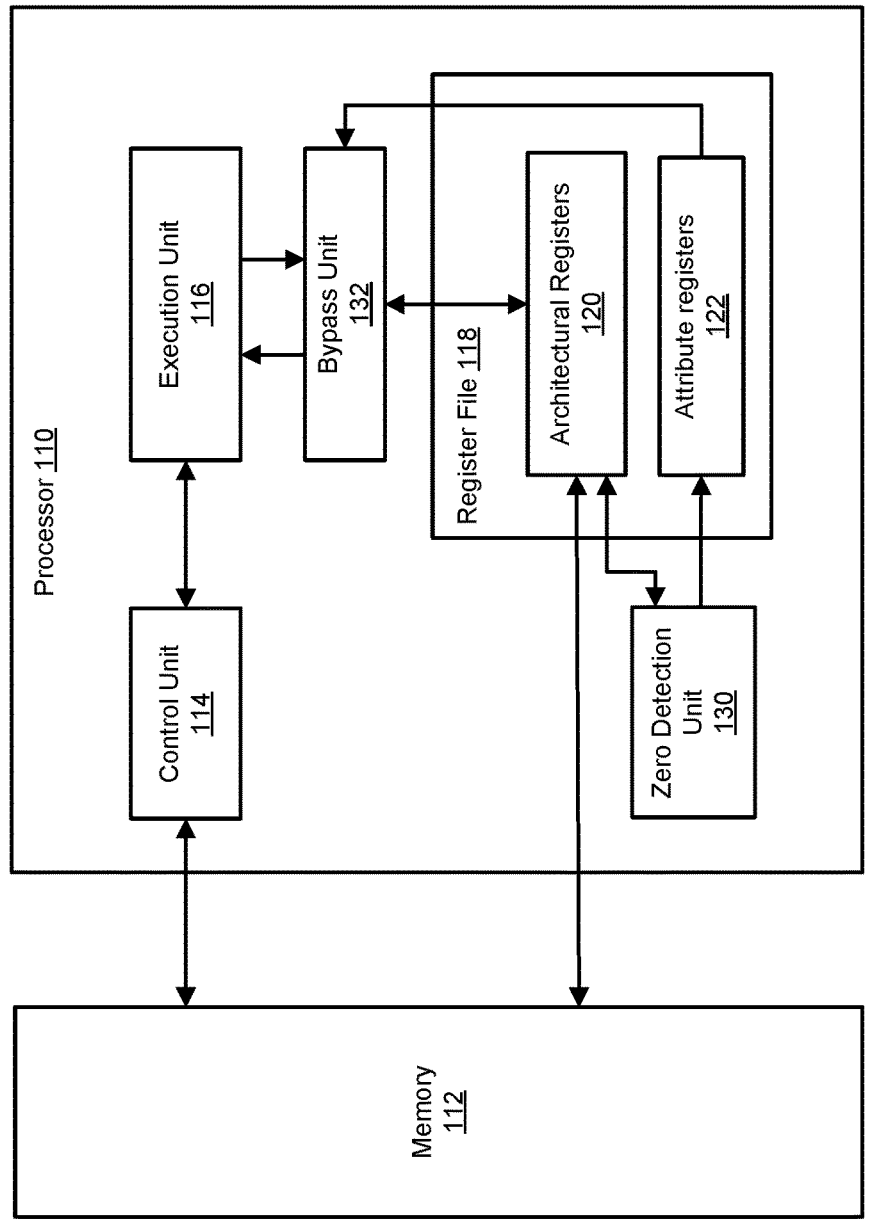
FIG. 1 is a block diagram of an example computer system according to certain aspects of the disclosure.

Embodiments are described herein for reducing power consumption by a computer processor through avoiding performance of (e.g., bypassing) an arithmetic or logical operation, based on detection of an input value before the arithmetic or logical operation can be completed. For example, a multiplication operation can be avoided when one of the inputs is zero, since the product of zero and another value is zero. In the described embodiments, zero detection is performed on a best effort basis, using logic that attempts to determine whether an input value is zero or not before the input value needs to be supplied to an arithmetic logic unit in the processor. Because input values can come from multiple sources in a computer system and with different timing delays, it is not always possible to make an early determination of what the input values are. When early detection is not possible, the arithmetic or logical operation can be allowed to proceed to completion. The logic for zero detection does not contribute significantly to overhead or power consumption as zero detection can be implemented fairly inexpensively using, for example, comparator circuits. Further, the power savings obtained as a result of not executing arithmetic or logical operations for which one of the inputs is zero is expected to outweigh the power used for implementing zero detection and bypass mechanisms.

One alternative to performing zero detection within the processor is to implement software instructions that indicate to the processor when the input is zero. However, this would require changing the instruction set architecture, e.g., by modifying instruction codes to include a field indicating whether an input is zero. Additionally, the processor hardware would have to be modified to support the new instruction set architecture. Moreover, a software based approach would require knowledge of all the input values in advance of program run time, e.g., at compile time. Thus, the software based approach is not always feasible and can involve extensive changes to the processor design and supporting software (compilers, operating systems, software libraries, etc.).

In contrast to the software based approach, the example zero detection and bypass mechanisms described herein can be implemented using logic within the processor itself. The logic can include hardware components such as digital comparators, logic gates, multiplexers, and other circuitry. The logic can be implemented without having to modify an instruction set architecture to support bypassing of arithmetic or logical operations. The logic does not require advance knowledge of input values and is designed to ensure correct program behavior even when the input values cannot be determined in advance of when they are needed by an arithmetic logic unit.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Techniques and corresponding embodiments are described herein for power reduction based on zero detection. The described embodiments are not limited to zero detection, but can readily be extended to detection of any input value that can serve as the basis for bypassing a processor operation. For example, in some embodiments, power reduction can be performed based on detection of input values of one (e.g., to bypass multiplication or division by one). Additionally, although the described embodiments can be applied in a pipelined processor architecture, the embodiments are equally applicable to non-pipelined processors and may be used in any processor where power reduction can be achieved through avoidance of performing an arithmetic or logical operation. Power reduction is expected to be especially significant in processors where operations are performed in parallel on multiple inputs concurrently, such as processors based on single instruction, multiple data (SIMD) architectures. Applications that involve computations performed on data in which a majority of the input values are zero, such as neural networks, are also expected to benefit from the techniques described herein.

FIG. 1 is a block diagram of an example computer system 100 according to certain aspects of the disclosure. The computer system 100 includes a processor 110 and a memory 112. FIG. 1 is intended to represent a variety of processor architectures, including pipelined and non-pipelined architectures. Accordingly, details of how the various processor components are communicatively coupled, and other components that may be included in the processor 110 (e.g., an instruction scheduler, a program counter, cache memory, etc.) have been omitted.

The memory 112 can be any storage memory located external to the processor 110. Memory 112 can, for example, be a dynamic random-access memory (DRAM) coupled to the processor 110 via a memory controller such as a direct memory access (DMA) controller. The memory 112 can be configured to store program code executed by the processor 110. The program code can be generated by a software compiler and can be formatted according to the specific instruction set architecture supported by the processor 110. The program code can include micro-operations that implement program instructions. For example, a multiplication operation C=A×B can be decomposed into an operation which loads the value of A from the memory 112 into an architectural register of the processor 110, an operation which loads the value of B from the memory 112 into another architectural register of the processor 110, an operation to multiply the loaded values of A and B, and an operation to write the result of the multiplication into a location in memory 112 corresponding to C.

The memory 112 can be further configured to store data used during execution of the program code. In the multiplication example described above, the data stored in the memory 112 could include values for A, B, and C. The memory 112 is just one example of a source for data used by the processor 110. In operation, the processor 110 may obtain data, such as input values for arithmetic or other operations, from any number of data sources. Data sources can include, for example, the memory 112, an external hard drive, a portable storage device, a cache memory in the processor 110, the output of an arithmetic logic unit (ALU), or any combination thereof.

The processor 110 can include a control unit 114, one or more execution units 116, a register file 118, a zero detection unit 130, and a bypass unit 132. As indicated in FIG. 1 by the arrows connecting bypass unit 132 to execution unit 116, the bypass unit 132 can be coupled to both an input and an output of the execution unit 116. The control unit 114 may be configured to receive instructions from the memory 112 for execution by the execution unit 116. The control unit 114 may, for example, fetch, decode, and route instructions to an appropriate component within the execution unit, such as an ALU. Although only one execution unit 116 is shown, the processor 110 can include more than one execution unit. For instance, the processor 110 can be a multi-core processor, or a single core processor with different types of ALUs.

The execution unit 116 can include circuitry configured to perform various types of operations. For example, the execution unit 116 can include an ALU for integer addition or subtraction, an ALU for integer multiplication, and one or more ALUs for addition, subtraction, multiplication, or other operations on floating point numbers. ALUs designed for floating point operations are sometimes referred to as floating point units (FPUs). In addition to arithmetic operations, ALUs can perform bitwise operations such as bit shifting and bitwise logical operations (e.g., AND, NOT, OR, and XOR). An ALU can be a circuit or set of circuits configured to perform a multiply-accumulate operation, such as a fused multiply-accumulate (FMAC, also known as fused multiply-add or FMA). In a multiply-accumulate operation, a value is updated to correspond to the sum of the value plus the product of two other values. FMA is a multiply-accumulate operation performed using floating point values.

The register file 118 comprises a set of architectural registers 120 that operate as temporary storage locations for data operated on by the processor 110. The architectural registers are generally defined in the processor's instruction set architecture and are therefore available to software that generates instructions for the processor 110. For instance, a compiler may convert program code written in a high level programming language such as C++, TensorFlow, or Java into instructions supported by the instruction set of the processor 110. The compiler generated instructions can reference the architectural registers 120 to store instruction operands (e.g., data values read from the memory 112), intermediate results (e.g., from an ALU of the execution unit 116), and final results pending writeback to the memory 112 or other storage location.

The register file 118 may further comprise a set of attribute registers 122. In certain embodiments, the attribute registers 122 are non-architectural registers configured to store information about the contents of the architectural registers 120. Each architectural register 120 may be associated with its own attribute register 122. An example attribute register is described below in connection with FIG. 2. When implemented as non-architectural registers, the attribute registers 122 may not be part of the instruction set architecture of the processor 110, and may therefore be inaccessible to or hidden from the compiler or other software. As explained in further detail below, each attribute register 122 can store a result of performing zero detection upon the contents of its associated architectural register 120. The results stored in the attribute register 122 can then be used to make a bypass decision when the contents of the associated architectural register are to be used as input to an arithmetic or logical operation.

The zero detection unit 130 comprises logic that evaluates the data content of the architectural registers 120 to appropriately set the values stored in the attribute registers 122. Although shown as a single block, the zero detection unit 130 may comprise multiple detection units, e.g., a single detection unit for each architectural register and/or each datapath leading to or from an architectural register. The zero detection unit 130 can be configured to perform a bitwise comparison on the data of an architectural register as the data is being written into or read out of the architectural register, to generate an output value indicating which bits of the data are zero. In particular, the zero detection unit 130 can generate, for each bit, a data value stored in the architectural register, an output value indicating whether the bit is zero or non-zero. Additionally, the zero detection unit 130 can be configured to set a flag in an attribute register to indicate whether the attribute register currently stores a valid result of a zero detection.

Figure 4:
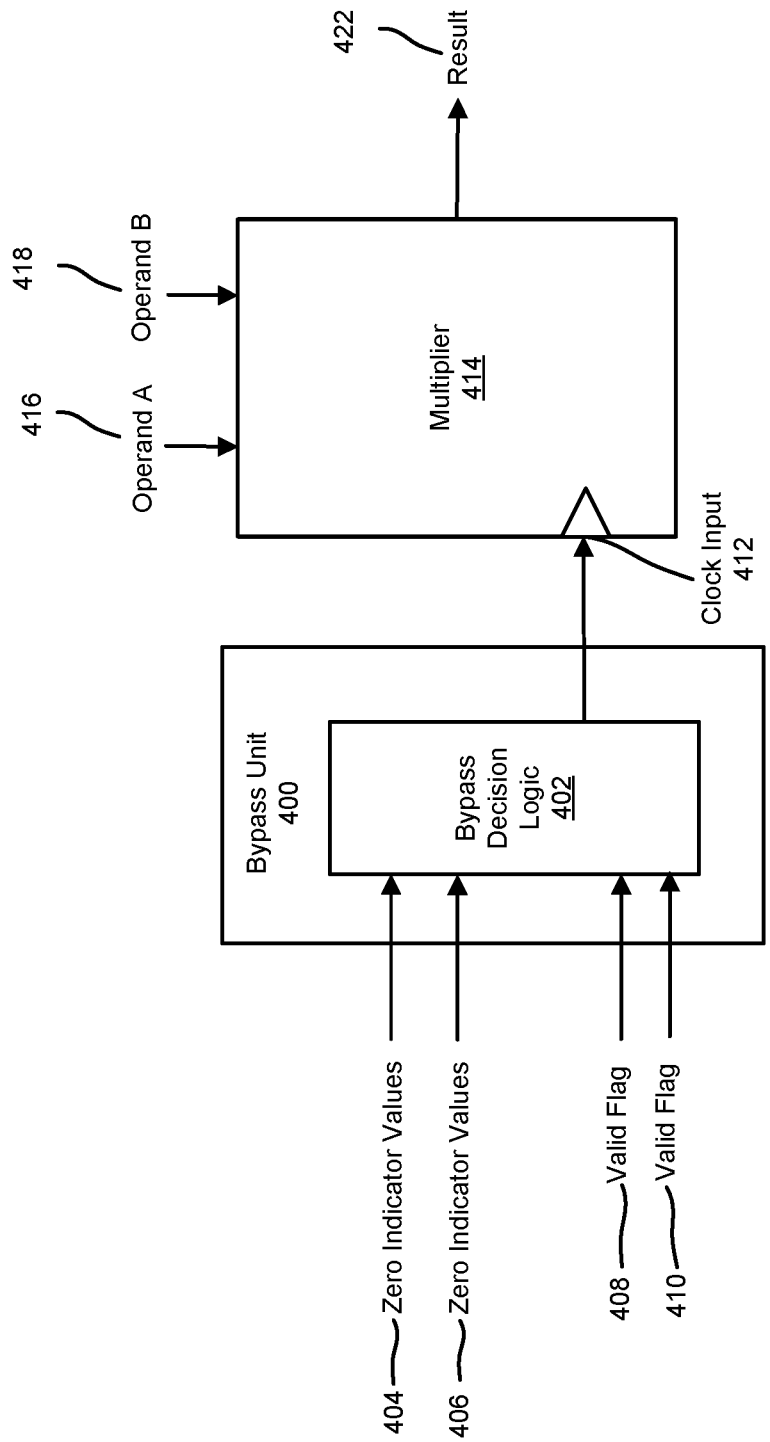
FIG. 4 illustrates an example of a bypass unit according to certain aspects of the disclosure.
Figure 5:
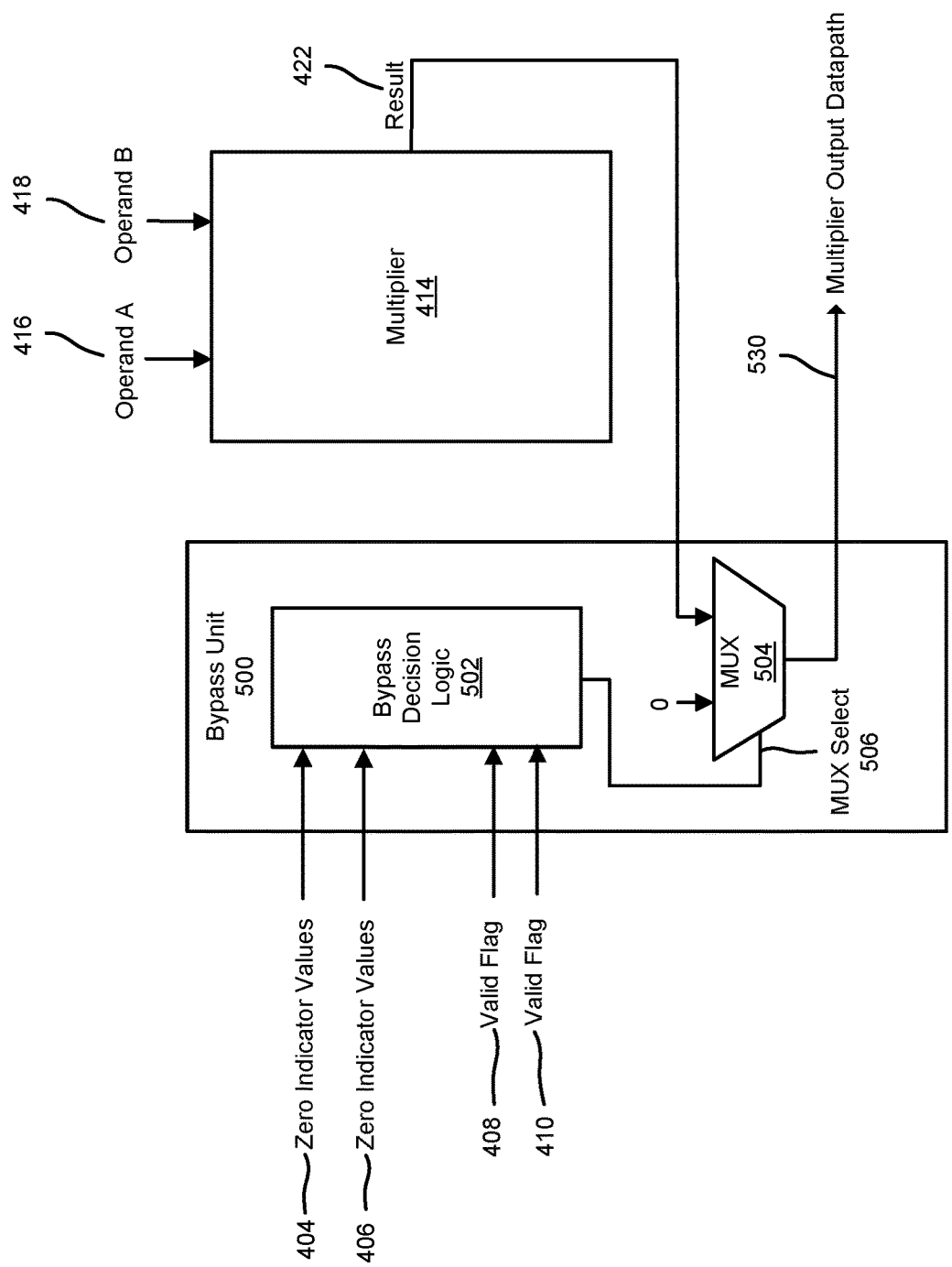
FIG. 5 illustrates an example of a bypass unit according to certain aspects of the disclosure.

The bypass unit 132 is configured to analyze the values stored in the attribute registers 122 to determine whether to bypass execution of an arithmetic or logical operation scheduled to be performed by the execution unit. As with the zero detection unit 130, the processor 110 may include multiple bypass units 132, for example, an individual bypass unit for each ALU. Bypassing can be implemented on the input side and/or the output side of an ALU. In certain embodiments, bypass is implemented on both the input and output sides, using a combination of bypass mechanisms that, when activated, prevent an arithmetic or logical operation from executing to completion (or not executing at all). Bypass on the input side is illustrated in FIG. 4. Bypass on the output side is illustrated in FIG. 5.

Figure 2:
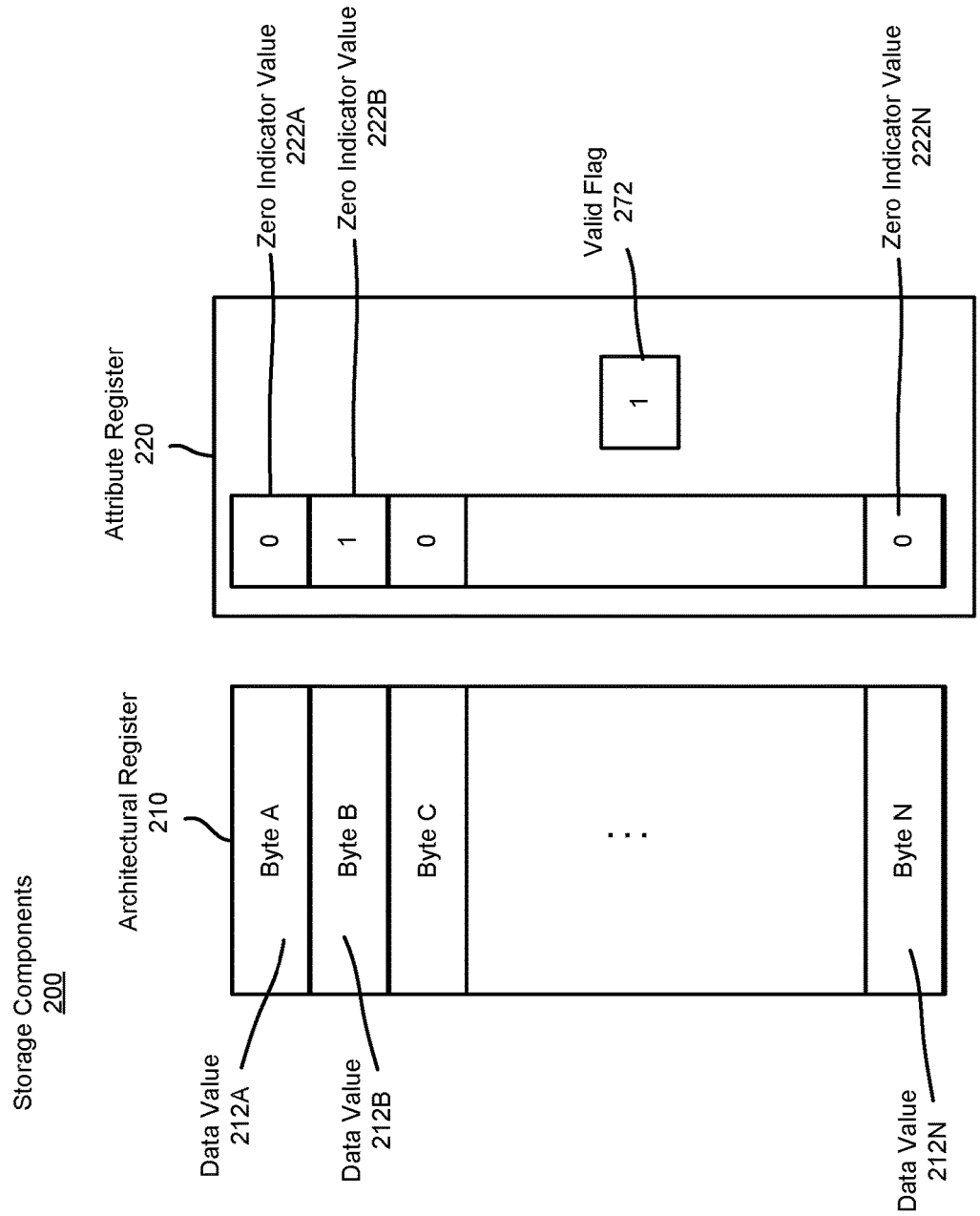
FIG. 2 illustrates example storage components in a computer system according to certain aspects of the disclosure.

FIG. 2 illustrates example storage components 200 in a computer system according to certain aspects of the disclosure. The storage components 200 include an architectural register 210 and an attribute register 220 associated with the architectural register 210. The architectural register 210 and the attribute register 220 can be used to implement, respectively, the architectural registers 120 and the attribute registers 122 of FIG. 1. The architectural register 210 can be a general purpose register capable of storing instructions and data. Alternatively, the architectural register 210 can be a special purpose register, for example, a floating point register dedicated to storing floating point numbers. The architectural register 210 can be an N byte register configured to store data values 212A-N, where each data value 212 is one byte long. For example, the architectural register 210 could be a 64-byte register with sixty four data entries. Other storage configurations for the architectural register 210 are also possible.

In the example of FIG. 2, the data values 212A-N could collectively form a single operand for an arithmetic or logical operation. Alternatively, in some embodiments, an architectural register could store data for two or more operands. For example, each operand of a plurality of operands could be stored as consecutive bytes in the architectural register 210.

The attribute register 220 is configured to store information about the contents of its associated architectural register, i.e., the architectural register 210. The information stored in the attribute register 220 may comprise metadata describing the attributes of the data stored in the architectural register 210. In particular, the attribute register 220 may store, for each data value or entry in the architectural register 210, a corresponding indicator value 222 indicating whether the data value is zero or not. For instance, indicator value 222A can be set to "1" to indicate that data value 212A is zero or set to "0" to indicate that the data value 212A is one. The attribute register 220 can be updated at various times including, for example, when data is about to be written into the architectural register 210 or when data is being read out of the architectural register 210.

The attribute register 220 may further include a flag 272 indicating whether the indicator values 222A-N are valid or not. When zero detection has been successfully performed on the contents of the architectural register 210, the flag 272 can be set to "1" to indicate that the indicator values 222A-N are valid. Otherwise, the flag 272 can be set to "0" to indicate that the indicator values 222A-N are invalid. Thus, if zero detection cannot be performed for any reason, the value of the flag 272 can be used to determine that the values 222A-N should not be used to make a bypass decision with respect to the contents of the architectural register 210. The valid flag 272 can be initialized to indicate that the indicator values 222A-N are invalid and, based on whether zero detection can be performed successfully, set to "0" or "1" each time data is to be written to the architectural register 210.

In certain embodiments, the attribute register 220 is a non-architectural register such that the attribute register 220 is not available for use as a storage location by the compiler. Thus, the attribute register 220 may represent architecturally hidden information available to the processor in which the architectural register 210 resides, but not available to the software source of the instructions executed by the processor. The attribute register 220 can be located on the same processor as the architectural register 210 (e.g., in the same register file, as depicted in FIG. 1). Alternatively, the attribute register 220 could reside in a location external to the processor, e.g., in a shared memory or on a peripheral device coupled to the processor. Thus, the attribute register 220 can be implemented in any memory location accessible to the processor on which the architectural register 210 resides. The attribute register 220 can be implemented using the same form of memory as the architectural register 210 or a different memory form. Various forms of memory may be suitable for implementing the attribute register 220 and the architectural register 210, including flip-flop, transistor, or transistor plus capacitor based storage circuits.

Figure 3:
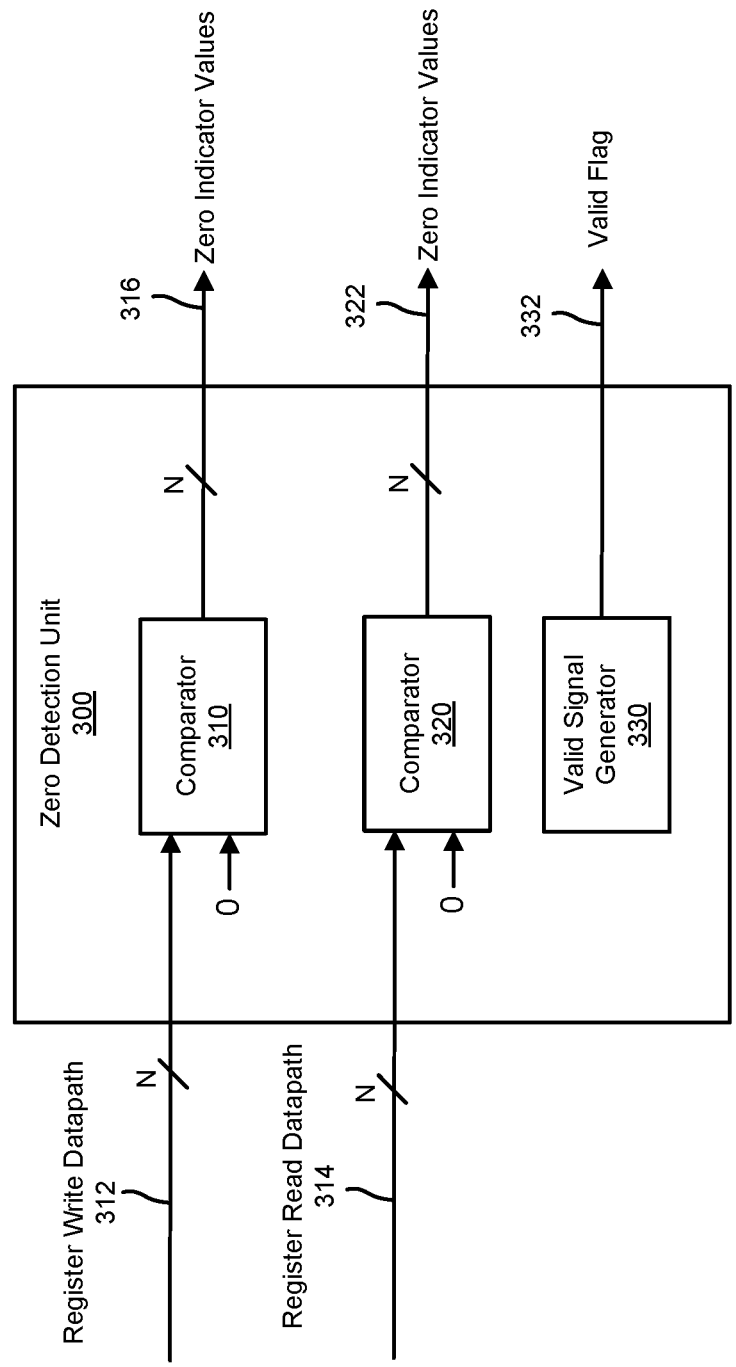
FIG. 3 illustrates an example of a zero detection unit according to certain aspects of the disclosure.

FIG. 3 illustrates an example of a zero detection unit 300 according to certain aspects of the disclosure. The zero detection unit 300 is an example of logic for updating an attribute register to indicate whether the contents of an architectural register have a particular value (e.g., zero or one, with a value of one being inferred when the comparison indicates that the data is non-zero). The zero detection unit 300 can be used to implement the zero detection unit 130 in FIG. 1 and may include a comparator 310, a comparator 320, and a valid signal generator 330. The comparators 310 and 320 can be configured to perform a bitwise comparison on each data entry of an architectural register. For example, if an entry is one byte long, each of the eight bits that make up the byte can be individually compared to zero to set a zero indicator value associated with that entry, e.g., to set the zero indicator value to "1" when all eight bits are zero. Comparator 310 is configured to compare data transmitted along a register write datapath 312 against a value of zero and, based on the comparison, generate indicator values 316. Similarly, comparator 320 is configured to compare data transmitted along a register read datapath 314 against a value of zero and, based on the comparison, generate indicator values 322. The indicator values 316, 322 can be output to the attribute register associated with the architectural register which the data is being written into or read from.

For any particular architectural register, there can be multiple read datapaths and multiple write datapaths that couple the architectural register to other components of the computer system. For example, the register write datapath 312 could be a path along which data is sent from a main memory (e.g., memory 112 in FIG. 1) into the architectural register. Alternatively, the register write datapath 312 could be a writeback path through which intermediate results produced by an ALU are written back to the architectural register. Similarly, the register read datapath could be a path through which data is read from the architectural register into an ALU. In certain embodiments, a separate comparator could be provided for each write datapath and/or each read datapath, and the comparators may be configured to perform zero detection based on the timing characteristics of their respective datapaths.

For write datapaths, the timing of when a comparator performs a comparison can vary depending on the datapath. For example, a comparison on data being written into an architectural register by a load operation that loads data from main memory can usually be performed in the same clock cycle as the load or move operation is executed, since there is generally a sufficient amount of time for the comparator to finish performing the comparison before the data is written into the architectural register. In contrast, a comparison on data being written into an architectural register from the result of a multiplication operation may, depending on the design of the multiplication ALU, not necessarily be able to be performed prior to writing the architectural register. Thus, the comparator 310 may be configured to determine when to perform the comparison based on where the data to be written to the architectural register is coming from. If a comparison cannot be performed (e.g., within the current clock cycle), the comparator 310 may delay the comparison, for example, by postponing the comparison until the next clock cycle, after the data has been written to the architectural register. If the architectural register is accessed in the next clock cycle by another process, the comparator 310 may further delay the comparison until the data can be read from the architectural register into the comparator 310.

For read datapaths, there is generally less concern regarding the ability to perform a comparison because the data is already present in the architectural register. Assuming the architectural register is not currently being used by another process, the data can be read from the architectural register into the comparator 320 to generate the indicator values 322 according to the results of the comparison. However, if by this time the results of zero detection are needed in order to make a bypass decision, it may be too late, in which case an arithmetic or logical operation that depends on the data may be allowed to proceed.

The valid signal generator 330 is configured to generate a flag 332 indicating whether the attribute register associated with the architectural register contains valid information. The value of the flag 332 can be set when a comparison is successfully performed on data being written to, or data that is currently stored in, the architectural register. For example, the valid signal generator 330 may be communicatively coupled to the comparators 310, 320 such that the valid signal generator 330 outputs a "1" when either of the comparators 310, 320 produces a result, i.e., the indicator values 316 or 322. In this manner, the flag 322 can be used to indicate whether a comparison, which resulted in the setting of indicator values 316 or 322, has been performed on the most recent data for the architectural register.

FIGS. 4 and 5 are examples of circuits configured for making a bypass decision based on determining that the data values for an architectural register are all zero (e.g., when each of the data values that collectively represent a single operand is zero). The bypass decision is made according to the values stored in an associated attribute register. For instance, in the example of FIG. 2, a bypass unit could examine the indicator values 222A-N to determine that the contents of the architectural register 210 are all zero when every indicator value 222 has been set to "1" and the flag 272 has also been set to "1". In embodiments where an architectural register stores multiple operands, the bypass unit could be configured to identify which zero indicator values are associated with a particular operand in order to determine whether the value of that particular operand is zero. For example, if each operand takes up three entries in an architectural register, the bypass unit can be hardwired or programmed to analyze the zero indicator values in sets of three.

FIG. 4 illustrates an example of a bypass unit 400. In the example of FIG. 4, the bypass unit 400 controls a clock input 412 of a multiplier 414. The bypass unit 400 includes bypass decision logic 402 that controls the clock input 412 based on zero indicator values 404, 406 and valid flags 408, 410. The zero indicator values 404 and the valid flag 408 may correspond to the indicator values 222A-N and flag 272 in FIG. 2. The zero indicator values 406 and the valid flag 410 may also correspond to the indicator values 222A-N and flag 272, but for a different attribute register and/or a different operand. For example, the zero indicator values 404 and the valid flag 408 can be values from an attribute register associated with an architectural register supplying the data for operand 416, and the zero indicator values 406 and the valid flag 410 can be values from an attribute register associated with an architectural register supplying the data for operand 418.

The multiplier 414 is configured to generate a result 422 corresponding to the product of the two operands 416 and 418, with the operands 416, 418 being input to the multiplier 414 through, for example, datapaths coupled to the output of architectural registers. For instance, each of the operands 416, 418 may correspond to the contents of a respective architectural register. Although the multiplier 414 is shown with two data inputs, the number of data inputs to an ALU can vary depending on the ALU and/or the operation to be performed by the ALU. Thus, a bypass decision can be made for an arithmetic or logical operation having any number of data inputs.

The bypass decision logic 402 can be configured to generate or selectively enable the clock input 412 (e.g., through clock gating). In some embodiments, the clock input 412 is coupled to the multiplier 414 through a switch controlled by the bypass decision logic 402. The bypass decision logic 402 can be implemented using, for example, combinational logic comprising digital logic gates that evaluate each of the zero indicator values 404 to determine whether or not all of the zero indicator values 404 have been set to indicate that corresponding data in an architectural register has a value of zero. For instance, the bypass decision logic 402 can include an AND logic gate or a series of AND gates into which the zero indicator values 404 and the valid flag 408 are input. Alternative implementations of bypass decision logic 402 are also possible. For instance, the logic for determining whether the zero indicator values 404 have been set to indicate zero can be triggered by the valid flag 408 so that the zero indicator values are only evaluated when the valid flag 408 has been set to "1". The zero indicator values 406 and the valid flag 410 can be evaluated in a similar manner.

The bypass decision logic 402 can be configured to make a decision to bypass the multiplication of the operands 416, 418 in response to determining, based on the zero indicator values 404, 406 and the flags 408, 410, that one or more of the operands 416, 418 has a value of zero. When a decision to bypass the multiplication is made, the bypass decision logic 402 can set the clock input 412 to disable the multiplier 414 so that no result 422 is produced by the multiplier 414. The bypass unit could be further configured to generate a substitute result for the result 422 that would have been produced by the multiplier 414, as explained below in connection with the example of FIG. 5. By disabling the multiplier 414, power that would otherwise be consumed in performing the multiplication is instead saved. In some embodiments, a bypass decision can be made even when the contents of an architectural register are not exactly zero. For instance, the bypass unit 400 could be user configurable so that a bypass decision is made when the contents of an architectural register are approximately zero (e.g., based on a certain number of most significant bits being all zero). The user may be provided with an option to configure how close the contents of the architectural register need to be to zero before a decision to perform bypass is made. Thus, bypass could be performed both when an operand is actually zero and when an operand is close to zero. Additionally, as mentioned previously, there may be instances when bypass is performed for a particular non-zero value, e.g., one.

FIG. 5 illustrates an example of a bypass unit 500 that operates upon the same zero indicator values 404, 406 and valid flags 408, 410 as the bypass unit 400 in FIG. 4. The bypass decision logic 502 is configured to generate a select input 506 to a multiplexer 504 based on a result of a bypass decision. The bypass decision made by the bypass decision logic 502 can be performed in the same manner described above with respect to the bypass decision logic 402. Depending on the result of the bypass decision, the bypass decision logic 502 can set the value of the select input 506 such that the multiplexer 504 selects either a value of zero or the result 422 of the multiplier 414 for output along a multiplier output datapath 530. In particular, the multiplexer 504 may output the zero value when a decision to perform bypass is made, and may output the result 422 when a decision not to perform bypass is made.

In the example of FIG. 5, the bypass unit 500 does not directly control the multiplier 414 (e.g., by selectively enabling/disabling the multiplier as in FIG. 4). Instead the bypass unit 500 is coupled to the output side of the multiplier 414 in order to ensure that a correct output (e.g., a value of zero) is generated and supplied to a consumer of the result 422 in the event that the multiplier 414 has been disabled. The bypass mechanisms described in connection with FIGS. 4 and 5 can be combined so that in addition to preventing the multiplier 414 from performing a multiplication when one of its operands is zero, the correct result of zero is substituted for the output of the multiplier. FIGS. 4 and 5 are merely examples of certain ways to bypass an arithmetic operation. Bypass units can be designed for other input situations (e.g., multiplication by one), other types of arithmetic operations (e.g., division by one), or for logical operations (e.g., bypass of an AND operation when one of the inputs is zero). Thus, in another embodiment, the bypass units 400, 500 could be configured to detect that one of the operands 416, 418 has a value of one and, based on this detection, disable the multiplier 414 in combination with routing the other of the two operands 416, 418 to the multiplier output datapath 530.

Figure 6:
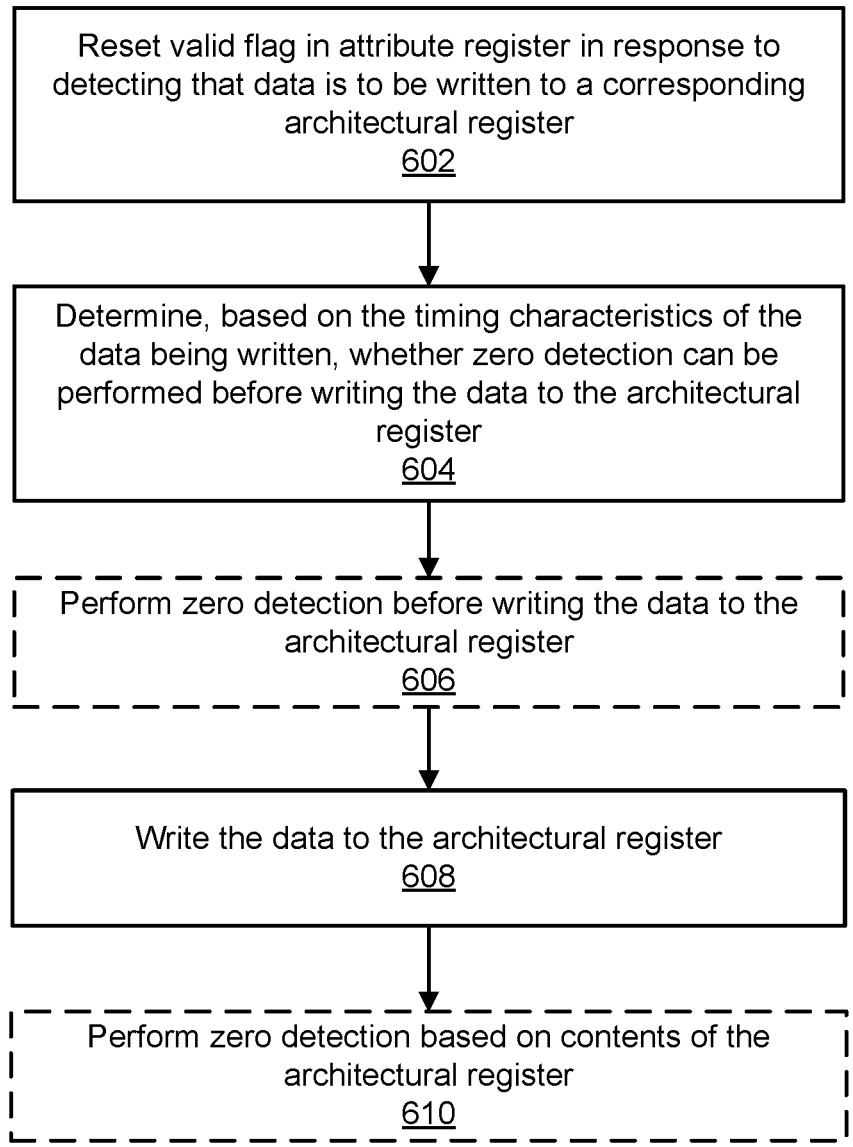
FIG. 6 illustrates an example process for detecting zeros according to certain aspects of the disclosure.

FIG. 6 is a flow diagram of an example process 600 for detecting zeros in the contents of an architectural register. The process 600 can be performed by a computer system, such as the computer system 100 in FIG. 1, comprising a zero detection mechanism and an attribute register configured to store results of a zero detection. At step 602, the computer system resets a valid flag in an attribute register (e.g., the valid flag 272 in FIG. 2) in response to detecting that data is to be written to a corresponding architectural register. The resetting of the valid flag ensures that the indicator values currently stored in the attribute register will not be used for making a bypass decision, as the currently stored values may correspond to values generated based on zero detection performed upon stale data.

At step 604, the computer system determines, based on the timing characteristics of the data being written, whether zero detection can be performed before writing the data to the architectural register. For example, as described earlier in connection with the example of FIG. 3, the zero detection unit can be coupled to different write datapaths, including datapaths associated with load operations, writebacks, and other operations that may write data from different sources (e.g., main memory) into the architectural register. The timing characteristics of these datapaths can vary such that zero detection may or may not be able to be performed successfully before the data is written into the architectural register.

At step 606, the computer system may perform zero detection, assuming that it was determined in step 604 that detection can be performed successfully. The zero detection may involve performing a bitwise comparison on each entry of the architectural register. For instance, if each entry is a single byte of data, each of the eight bits that make up the byte of data can be input to a comparator circuit configured to output a value of "1" when all eight bits are zero. The output of this comparator circuit can be then be used to set the value of a corresponding bit (e.g., an indicator value 222 in FIG. 2) in the attribute register associated with this architectural register. The data that is input to the comparator can be obtained by intercepting the data as it is being sent along the write datapath, enroute to its destination in the architectural register.

At step 608, the computer system writes the data into the architectural register. For example, if the data being written in step 602 is data loaded from main memory, a read request may have been sent to main memory to read the data from a particular memory address, and in step 608 the data that has been read from main memory is now written to a corresponding address assigned to the architectural register.

Step 610 can be performed when it is determined, in step 604, that zero detection cannot be performed before writing the data to the architectural register. Thus, step 610 follows the writing of the data in step 608. In step 610, zero detection is performed in a similar manner to the zero detection in step 606, except that the comparison is done on the contents of the architectural register. In both steps 606 and 610, the valid flag of the attribute register can be set, for example upon completion of the comparison, in order to make the values stored in the attribute register available for use in a bypass decision. In some embodiments, step 610 can be performed irrespective of whether step 606 is also performed. As mentioned earlier, zero detection can be performed relatively inexpensively, especially in comparison to the resources need for certain arithmetic operations such as floating point multiplication. Therefore, performing zero detection both before and after writing to an architectural register, while being redundant, generally does not have an adverse effect on processor performance.

FIG. 7 is a flow diagram of an example process 700 for power reduction based on zero detection. The process 700 can be performed by a computer system, such as the computer system 100 in FIG. 1, comprising an attribute register storing results of a zero detection and a bypass mechanism operating on the results stored in the attribute register. At step 702, the computer system detects that data is to be read from an architectural register for input to an ALU (e.g., the multiplier 414). The detection can be performed, for example, using a bypass unit coupled to the input and/or output of the ALU. The bypass unit can encompass aspects of the bypass unit 400, the bypass unit 500, or a combination thereof. Further, the bypass unit may include logic configured to perform the detection in 702 based on determining that the ALU has been scheduled to perform an arithmetic or logical operation (e.g., in the next clock cycle) and that one or more of operands for the arithmetic or logical operation are stored in an architectural register. Thus, the bypass decision can be initiated when the data is about to be sent from the architectural register to the ALU. In some embodiments, this detection can be performed by a processor component external to the bypass unit. In response to the detection in step 702, the computer system initiates a bypass decision to be performed by the bypass unit. The bypass decision begins at step 704.

At step 704, the bypass unit determines whether zero detection has been performed on the architectural register from which the data is to be supplied to the ALU. The determination of whether zero detection has been performed can involve the bypass unit reading the value of a valid flag (e.g., flag 272 in FIG. 2) in an attribute register associated with the architectural register. As described earlier, the valid flag can be set in connection with a successful comparison against data being written into or read out of an architectural register. Thus, the valid flag can indicate whether a zero detection has already been performed on the data to be sent to the ALU.

Step 706 can be performed when the result of the determination in step 704 indicates that zero detection has already been performed. At step 706, the bypass unit determines whether the results of the previously performed zero detection indicate that the data is all zeros. The determination of whether the results of the zero detection indicate that the data is all zeros can involve the bypass unit reading the zero indicator values (e.g., indicator values 222A-N) from the attribute register and passing the zero indicator values through logic gates or other circuitry that evaluates the zero indicator values. The bypass unit can then activate the bypass mechanism according to the results of determining whether the data is all zeros. For instance, if the data is an operand to a multiplier unit, the bypass mechanism can be activated based on the operand being zero. The bypass mechanism may, as described in the examples of FIGS. 4 and 5, disable the ALU or otherwise interrupt the ALU's operations, generate an output as a substitute for the output of the ALU (e.g., using a multiplexer as depicted in FIG. 5), or both. In the example of FIG. 4, the ALU (multiplier 414) is selectively activated through clock gating. The ALU can also be activated by applying a power signal, routing of the data to an input of the ALU, or in general controlling a certain input of the ALU.

Step 708 can be performed when the result of the determination in step 704 indicates that zero detection has not yet been performed. At step 708, the bypass unit decides not to activate the bypass mechanism. Thus, the arithmetic or logical operation to be performed by the ALU using the data from the architectural register is allowed to proceed. This is because the associated attribute register has not been updated with valid results of a zero detection, so the bypass unit has no basis for making the bypass decision. Thus, at least some embodiments of the system can bypass or skip arithmetic or logical operations on a "best effort" basis: if it is possible to perform zero detection within an acceptable time period, then the detection is performed; if this is not possible, then the operation is allowed to proceed. This allows for some operations to be skipped and energy to be conserved without unacceptably slowing performance of the system.

Figure 8:
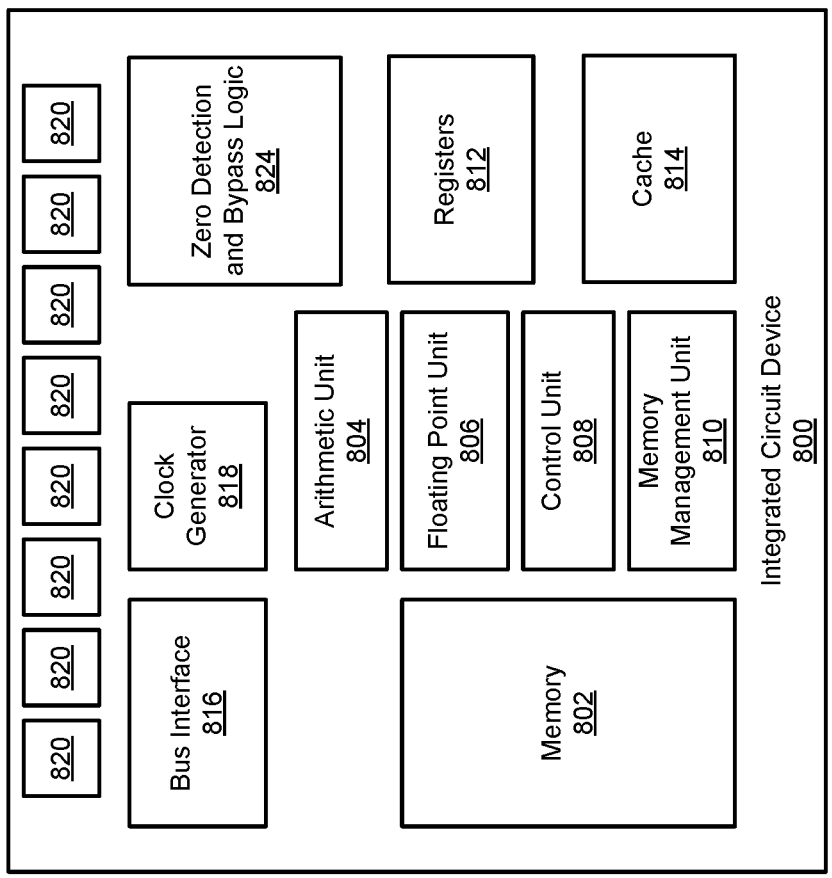
FIG. 8 illustrates an example of an integrated circuit device in which certain aspects of the disclosure can be implemented.

FIG. 8 is a block diagram of an integrated circuit device 800. The integrated circuit device 800 is an example of a device on which the power reduction techniques discussed above can be applied. The integrated circuit device 800 includes components that can correspond to those of the computer system 100 in FIG. 1. For example, the memory 112 in FIG. 1 can correspond to a memory 802 within the integrated circuit device 800. Alternatively, the memory 112 can be an external memory coupled to the integrated circuit device 800 via a communication interface.

The example integrated circuit device 800 includes the memory 802, an arithmetic unit 804, a floating point unit 806, a control unit 808, a memory management unit 810, registers 812, a cache 814, a bus interface 816, a clock generator 818, multiple I/O pads 820, and zero detection and bypass logic 824.

The memory 802 can include circuits that are able to store values. For example, the memory 802 can store instructions that are to be executed by the integrated circuit device 800. The memory 802 can also store data, including data destined for an architectural register. The memory 802 can be implemented using, for example, Static Random Access Memory (SRAM).

The arithmetic unit 804 and the floating point unit 806 are examples of ALUs that can be included in the integrated circuit device 800. The arithmetic unit 804 is configured to perform arithmetic or logical operations. The arithmetic unit 804 can be configured, for example, to read one or more operands from the registers 812, perform an arithmetic or logical operation of the one or more operands, and place the result into one of the registers 812.

The floating point unit 806 can perform arithmetic of logical operations on floating point values. The floating point unit 806 can also be configured to read operands from the registers 812 and to write results to the registers 812.

The control unit 808 can include circuitry for executing instructions and/or for coordinating the activities of the other blocks in the integrated circuit device 800. For example, the control unit 808 can configure the registers from which arithmetic unit 804 obtains operands, as well as the operation the arithmetic unit 804 is to perform on the operands. The control unit 808 can further instruct the arithmetic unit 804 where to place a result of the operation. As a further example, the control unit 808 can write data into the registers 812, and read data from the registers 812, possibly to move the data to the memory 802 and/or elsewhere.

The memory management unit 810 can manage the memory 802, the cache 814, and possibly also the registers 812. The memory management unit 810 can, for example, cause data to be moved from the memory 802 to the cache 814, or vice versa. As a further example, the memory management unit 810 can cause data to be moved from the cache 814 to an external memory, or vice versa. In various examples, the operations the memory management unit 810 perform are controlled by the control unit 808. For example, when the control unit 808 determines that the integrated circuit device 800 is ready for new instructions to be loaded into the memory 802, the control unit 808 can instruct the memory management unit 810 to obtain the instructions from an external memory.

The registers 812 can include architectural registers that provide temporary storage for values being operated on by the integrated circuit device 800. The registers 812 can further include attribute registers configured to store information about the contents of the architectural registers. Compared to the memory 802, each architectural register of the registers 812 can be quite small, storing, for example, one data word each (where a data word can be 16, 32, 64, or another number of bits long). Each architectural register is also directly accessible, such that the number of registers may be limited by the wiring required for each to be independently readable and writeable. Because the architectural registers of the registers 812 are directly accessible and can be read or written faster than the memory 802, it may be preferable for values being operated on by, for example, the arithmetic unit 804 or the floating point unit 806, to be in the architectural registers, rather than in the memory 802. Therefore, values stored in memory 802 or some other location can be preloaded onto the architectural registers for faster access when the values are needed, for example, by an ALU.

The cache 814 is a memory where data that was recently used by the integrated circuit device 800, and/or that may soon need to be used, can be stored. The data may have been, for example, stored in the memory 802, operated on by the control unit 808, and then moved to the cache 814 to make space in the memory 802 for new data. As another example, the integrated circuit device 800 may have needed a particular data word, which the memory management unit 810 may have loaded into the cache 814 along with a set of data words (e.g., a cache line), under the assumption that the integrated circuit device 800 may need a data word that was stored in external memory next to the particular data word. The cache 814 can thus save time by reducing how frequently the integrated circuit device 800 needs to access external memory. Determining when data needs to be loaded into the cache from an external memory, and/or when data needs to be moved out of the cache, can be handled by the memory management unit 810.

The bus interface 816 can include circuitry that enables the integrated circuit device 800 to communicate with other devices, such as external memories. The bus interface 816 can implement various protocols, such as Advanced eXtensible Interface (AXI), Advanced High-performance Bus (AHB), Peripheral Component Interconnect (PCI), or another bus protocol. The bus interface 816 can be connected to the I/O pads 820 to enable the bus interface 816 to communicate with external devices. In various examples, the integrated circuit device 800 can include multiple bus interfaces, which may implement different protocols.

The clock generator 818 can generate one or more clock signals for the integrated circuit device 800, which may have different frequencies. In some examples, the clock generator 818 operates off of a clock input to the integrated circuit device 800 (received at one of the I/O pads 820), which the clock generator 818 can use to generate clock signals of different frequencies.

The I/O pads 820 can include circuitry for connecting the integrated circuit device 800 to the physical pins or balls (e.g., drops of conductive material) of the package that encloses the integrated circuit device 800. The pins or balls can connect the integrated circuit device 800 to a printed circuit board. Some of the I/O pads 820 can be for inputting signals into the integrated circuit device 800, others can be for outputting signals from the integrated circuit device 800, and/or others can be bi-directional. In most cases, the I/O pads 820 are present along most of the edges of the integrated circuit device 800, but only a few are illustrated here, for the sake of clarity.

The zero detection and bypass logic 824 can include logic configured to detect zeros or other values in data destined for or previously written to an architectural register of the registers 812. The zero detection and bypass logic 824 can, for example, implement the zero detection unit 300 of FIG. 3 and the bypass units 400 and 500 of FIGS. 4-5. In certain embodiments, the zero detection and bypass logic 824 is configured to implement bypassing at least in part by selectively applying a clock signal to one or more ALUs. For example, the zero detection and bypass logic 824 can include logic that determines, based on the results of zero detection, whether a clock signal generated by the clock generator 818 is applied to the arithmetic unit 804 and/or the floating point unit 806.

The blocks illustrated in FIG. 8 are examples of blocks that can be found in an integrated circuit device, and are intended only to be illustrative. In other examples, an integrated circuit device can include components that are not illustrated here, can include multiple instances of a component, and/or can lack some of the components that are included in this illustration. The arrangement and spacing of the blocks is also not intended to be representative of the arrangement and spacing that may be found in an actual device. The arrangement and spacing have been selected only for the convenience of the illustration.

Figure 9:
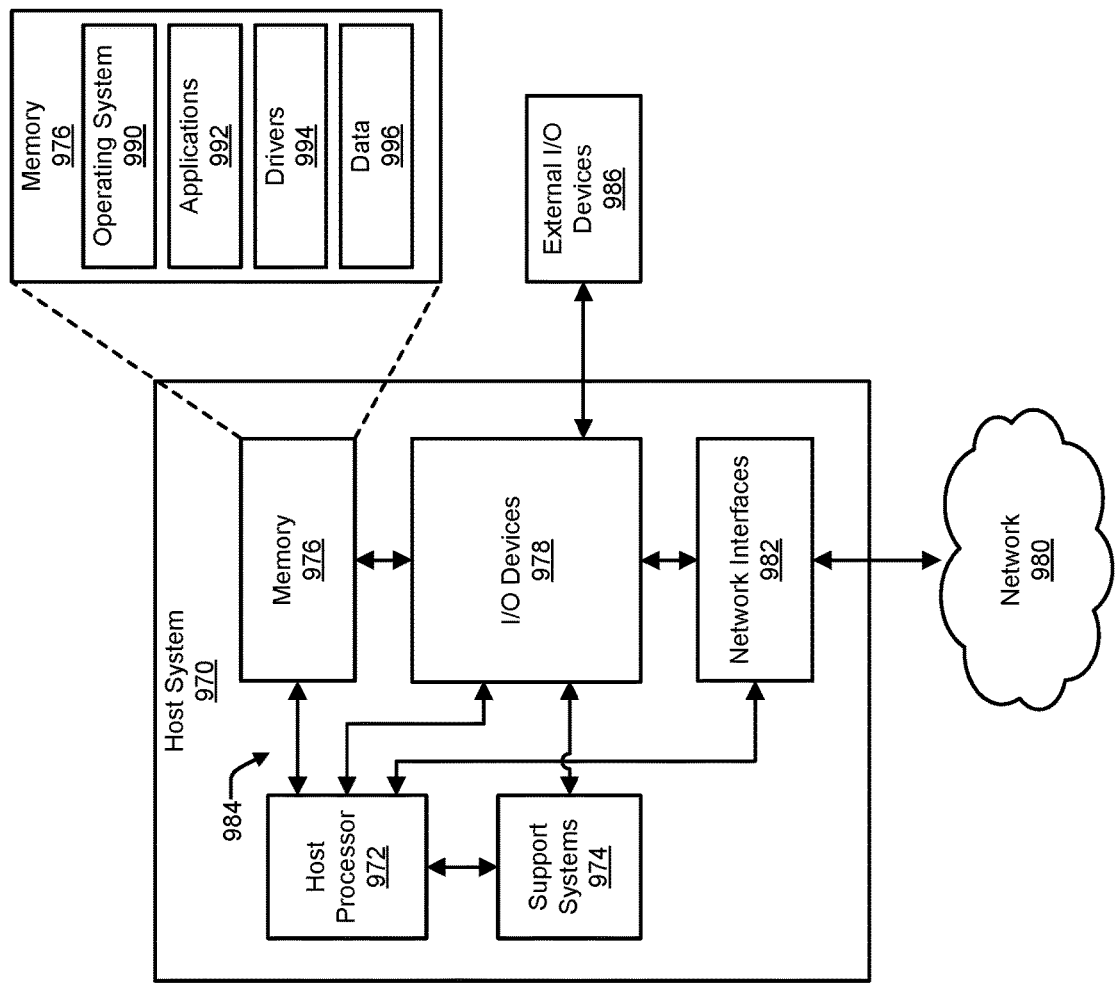
FIG. 9 illustrates an example of a host system in which the integrated circuit device of FIG. 8 can be used.

FIG. 9 is a block diagram of a host system 970. The host system 970 is an example of a computer system in which the integrated circuit device 800 of FIG. 8 can be used. In some examples, the host system 970 can be used to implement a general purpose computer, such as a desktop computer, a laptop computer, a server computer, a thin client, and so on. In some examples, the host system 970 can be used to implement mobile computing devices, such as a mobile phone, a smart phone, a personal digital assistant (PDA), or a tablet computer, among other examples. In some examples, the host system 970 can be used to implement somewhat more special purpose devices, such as home assistants, gaming consoles, electronic books (e-books), media centers, and so on. In some examples, the host system 970 can be used to implement computing devices incorporated into appliances, automobiles and other vehicles, robots, and other electronic devices.

The host system 970 includes a host processor 972, a memory 976, Input/Output (I/O) devices 978, network interfaces 982, and various support systems 974. In various implementations, the host system 970 can include other hardware that is not illustrated in FIG. 9.

The host processor 972 is a general purpose integrated circuit that is capable of executing program instructions. In some examples, the host processor 972 can include multiple processing cores. In a multi-core processor, each core may be able to independently execute program code. In some examples, the cores may share resources, such as buses and caches. In some examples, the host processor 972, whether single core or multi-core, may be a multi-threaded processor, in which case the host processor 972 can execute multiple threads of execution (e.g., independent sets of program code) at the same time. In some examples, the host system 970 can include more than one host processor 972.

The memory 976 can include memory that is used by the host processor 972 for storage of program code that the host processor 972 is in the process of executing, as well as for storage of values that are being operated on by the host processor 972. For example, the memory 976 can store an operating system 990, one or more applications 992, one or more device drivers 994, and data 996 associated with the operating system 990, the applications 992, and/or the drivers 994. The data 996 can include data destined for an architectural register of the host processor 972. In various examples, the memory 976 can be implemented using volatile memory types (such as Random Access Memory (RAM) type memories) and/or non-volatile memory types (such as Read-Only Memory (ROM), flash memory, etc.). In some examples, some or all of the memory 976 may be accessible to the I/O devices 978.

The operating system 990 can coordinate the activities of the hardware of the host system 970, as well as the activities of the applications 992 and drivers 994. For example, the operating system 990 can perform operations such as scheduling tasks, executing applications, or controlling peripheral devices. In some examples, the operating system 990 can include a hypervisor which can support the operation of virtual machines on the host system 970. In some examples, the hypervisor runs as kernel space application. In these and other examples, each virtual machine can execute an independent operating system, and may have different virtual hardware configurations. Examples of operating systems include Unix, Linux, Windows, Mac OS, iOS, Android, and the like. The operating system 990 may also be a proprietary operating system.

The applications 992 can enable a user to interact with the host system 970 and/or with systems on the network 980. The applications 992 can include user space applications, such as web browsers, text editors, video or audio players, and so on. Each of the applications 992 can be embodied as program code, or instructions that, when executed, cause the host processor 972 to perform operations that implement the applications 992. In various examples, the code for the applications 992 can be stored on a non-volatile storage medium, such as a disk drive, and can be copied into the memory 976 when being executed.

The drivers 994 can include programs that manage communications between the operating system 990 and/or applications 992 and hardware components of the host system 970, such as the I/O devices 978 and network interfaces 982. For example a driver can provide an Application Programming Interface (API) that provides abstract commands for using the functions of an I/O device. In this example, the API may be standardized, and the driver may be able to translate the abstract commands to specific commands for a particular I/O device. Drivers are often kernel space applications, so that user-space code may be prevented from accidentally or intentionally misusing the hardware of the host system 970.

The data 996 can include data used and/or operated on by the operating system 990, applications 992, and/or drivers 994. Examples of such data include web pages, video data, audio data, images, user data, and so on. Alternatively or additionally, the data 996 can include software libraries that maybe used by the operating system 990, applications 992, and/or drivers 994. In some examples, the data 996 may be accessible to systems on the network 980.

The I/O devices 978 can include hardware that adds functionality to the example host system 970. For example, the I/O devices 978 can include non-volatile storage devices, such as solid state drives, magnetic drives, optical drives, and/or tape drives, among other examples. The I/O devices 978 can further include accelerators such as graphics accelerators, and other, more special purpose, devices. As another example, the I/O devices 978 can include hardware for connecting to external I/O devices 986, such as keyboards, monitors, printers, and external storage drives among other devices. The network interfaces 982 are also I/O devices, though are illustrated separately here for the sake of clarity. Herein, some I/O devices may also be referred to as peripheral devices. In various examples, an I/O device can include a processor and memory that are additional to the host processor 972 and memory 976 of the host system 970. The processor of the I/O device may operate independently of the host processor 972, or maybe used by the host processor 972 for various purposes. For example, the I/O device can include a Graphics Processing Unit (GPU), which the host processor 972 can use for graphics related computations. The power reduction techniques described herein can be implemented in a GPU or other processor of an I/O device in addition to being implemented on the host processor 972. For example, an I/O device 978 can include zero detection and bypass logic. In some examples, the host system 970 can also be connected to external I/O devices 986, such as external hard drives.

In some examples, one or more of the I/O devices 978 can be based on one of the Peripheral Component Interconnect (PCI) standards. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices in a host system. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the host system 970 can include a storage device that implements NVMe as the primary communication interface.

A PCI-based device can include one or more functions. A "function" describes operations that may be provided by the device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, a PCI-based device can include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to the operating system 990 and/or applications 992 to be multiple devices providing the same functionality. The functions of an SR-IOV-capable device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on the host system 970.

The network interfaces 982 can enable the host system 970 to communicate with a network 980 or with multiple networks. The network interfaces 982 can include, for example, one or more network interface cards (NICs). The network interfaces 982 can include, for example, physical ports for connecting to a wired network. Alternatively or additionally, the network interfaces 982 can include antennas for connecting to a wireless network. In some examples, the network interfaces 982 can include more than one physical port, and/or more than one antenna, so that the host system 970 can communicate with multiple networks at the same time.

The support systems 974 can include various hardware that supports the operations of the host processor 972 and/or the I/O devices 978. For example, the support systems 974 can include a boot ROM that stores the code for the Basic Input/Output System (BIOS) of the host system 970, and that enables the host system 970 to boot from being powered on. As another example, the various support systems 974 can include a power supply and power subsystem. Other devices that may be found in the support systems 974 can include a Board Management Controller (BMC) and/or various other volatile or non-volatile memories.

The host system 970 can further include one or more busses 984, which may also referred to as interconnects. The busses 984 can enable the various components of the example host system 970 to communicate with one another. For example, the busses 984 can include a bus that is dedicated to communications between the host processor 972 and the memory 976. As another example, the busses 984 can include an I/O bus, which enables the host processor 972 to communicate with the I/O devices 978, and which may enable the I/O devices 978 to communicate among each other. In some examples, the I/O bus is a PCI-based bus or bus network. The busses 984 can include other busses, such as a power management bus, sideband busses, control busses, and/or dedicated busses between certain components (e.g., a BMC and the host processor 972).

The memory 976, storage devices, and other memories discussed above are each examples of computer-readable medium. Other examples of computer-readable medium include removable storage devices, such as magnetic tapes, floppy disks, Compact Discs (CDs), Digital Versatile Discs (DVDs), Blue-Ray disks, and flash memory drives, among other examples. In each of these examples the compute-readable medium is capable of storing program code that can be executed by the host processor 972. In some cases, the computer-readable medium may be non-transitory, meaning that the data stored on the computer-readable medium remains stored on the medium when power is not applied to the computer readable medium. In contrast, when power is removed from transitory computer-readable medium, such as RAM, the data is deleted from the medium. Examples of non-transitory computer-readable medium include ROM-based memory, hard disks, removable disks such as those listed above, and flash-based memory, among other examples.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner illustrated in the drawings and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of reducing power consumption in a processor, comprising:
    comparing, by a detection unit of the processor, data representing a first operand to zero, wherein the comparison is performed before or after writing the data representing the first operand to a first architectural register;
    updating, by the detection unit, a first attribute register for the first architectural register, wherein the updating of the first attribute register comprises storing, in the first attribute register, values corresponding to a result of the comparison together with a flag indicating that the comparison has been successfully performed;

determining, by a bypass unit of the processor, that the first operand is an input for a first multiplication operation scheduled to be performed by an arithmetic logic unit (ALU) of the processor;

determining, by the bypass unit, that the first operand has a value of zero, wherein the determination that the first operand has a value of zero is based on the values stored in the first attribute register and is performed in response to the determination that the first operand is to be supplied as an input for the first multiplication operation;

preventing, by the bypass unit, the ALU from performing the first multiplication operation based on the determination that the first operand has a value of zero;

determining, by the bypass unit, that a second operand is an input for a second multiplication operation scheduled to be performed by the ALU;

determining, by the bypass unit and based on a flag in a second attribute register for a second architectural register in which data representing the second operand is stored, that a comparison has not yet been performed on the data representing the second operand; and permitting, by the bypass unit and based on the determination that a comparison has not yet been performed on the data representing the second operand, the ALU to perform the second multiplication operation.

2. The method of claim 1, wherein the first attribute register is a non-architectural register associated with the first architectural register, and wherein the second attribute register is a non-architectural register associated with the second architectural register.

3. The method of claim 1, wherein a timing of the comparison performed on the data representing the first operand depends on which datapath of a plurality of datapaths was used to write the data representing the first operand to the first architectural register.

4. An apparatus, comprising:
an arithmetic logic unit (ALU) configured to perform an arithmetic or logical operation using an operand;
a register configured to store data for the operand, the data being written to the register prior to the performing of the arithmetic or logical operation;
a detection unit configured to:
determine whether the data being written to the register has a particular value, wherein the determination is made before or after the data is written to the register depending on a timing of when the data is supplied to the register;
set values of a memory associated with the register based on a result of the determination; and
set a flag in the memory associated with the register to indicate that the determination was successfully performed; and
a bypass unit configured to prevent the ALU from performing the arithmetic or logical operation based on the values of the memory indicating that the data has the particular value and further based on the flag indicating that the determination was successfully performed.

5. The apparatus of claim 4, wherein the data is stored in a plurality of entries within the register, and wherein the memory comprises an additional register configured to store, for each entry, an indicator of whether the entry has the particular value.

6. The apparatus of claim 5, wherein the additional register is a non-architectural register.

7. The apparatus of claim 4, wherein the bypass unit comprises logic configured to, in response to determining that the data in the register is needed for the arithmetic or logical operation, determine whether to allow the ALU to perform the arithmetic or logical operation.

8. The apparatus of claim 7, wherein the bypass unit allows the ALU to perform the arithmetic or logical operation when the values of the memory indicate that the data does not have the particular value.

9. The apparatus of claim 7, wherein the bypass unit allows the ALU to perform the arithmetic or logical operation when the flag indicates that the determination of whether the data has the particular value has not yet been made by a time the data is to be sent from the register to the ALU.

10. The apparatus of claim 4, wherein the bypass unit is configured to control whether the ALU performs the arithmetic or logical operation by controlling a clock input to the ALU.

11. The apparatus of claim 4, wherein the arithmetic or logical operation is multiplication, and wherein the bypass unit prevents the ALU from performing the multiplication based on the values of the memory indicating that the data is zero.

12. The apparatus of claim 4, wherein the arithmetic or logical operation is multiplication, and wherein the bypass unit prevents the ALU from performing the multiplication based on the values of the memory indicating that the data has a particular non-zero value.

13. The apparatus of claim 4, wherein the bypass unit is configured to generate a substitute result for the arithmetic or logical operation when preventing the ALU from performing the arithmetic or logical operation.

14. The apparatus of claim 13, wherein the substitute result is generated using a multiplexer.

15. The apparatus of claim 4, wherein the detection unit comprises a comparator configured to perform a bitwise comparison on the data.

16. The apparatus of claim 15, wherein the values of the memory associated with the register include values corresponding to a result of the bitwise comparison, and wherein the bypass unit comprises combinational logic into which the values corresponding to the result of the bitwise comparison are input to determine whether the values corresponding to the result of the bitwise comparison indicate that the data has the particular value.

17. A computer-implemented method, comprising:
determining, by a detection unit of a processor, that data is being written to a register of the processor, wherein the data corresponds to an operand of an arithmetic or logical operation to be performed by an arithmetic logic unit (ALU) of the processor;
determining, by the detection unit, whether the data being written to the register has a particular value, wherein the determination is made before or after the data is written to the register depending on a timing of when the data is supplied to the register;
setting, by the detection unit, values of a memory associated with the register based on a result of the determination;
setting, by the detection unit, a flag in the memory to indicate that the determination was successfully performed; and
preventing, by a bypass unit of the processor, the ALU from performing the arithmetic or logical operation in response to the bypass unit determining that the values of the memory indicate that the data has the particular value and, based on the flag, that the determination was successfully performed.

18. The computer-implemented method of claim 17, wherein the data is stored in a plurality of entries within the register, the method further comprising:
  determining, for each entry, whether the entry has the particular value; and
  storing a separate indicator value in the memory for each entry, the indicator value indicating whether a corresponding entry has the particular value.

19. The computer-implemented method of claim 17, further comprising:
  in response to determining, by the bypass unit, that the data in the register is needed for the arithmetic or logical operation, making a decision whether to allow the ALU to perform the arithmetic or logical operation.

20. The computer-implemented method of claim 19, wherein the decision whether to allow the ALU to perform the arithmetic or logical operation depends on a value of the flag at a time the data is to be sent from the register to the ALU.

* * * * *